United States Patent [19]
Suzuki

[11] Patent Number: 5,707,313
[45] Date of Patent: Jan. 13, 1998

[54] TRANSMISSION CONTROL APPARATUS FOR FRICTION-WHEEL CVT

[75] Inventor: Yutaka Suzuki, Atsugi, Japan

[73] Assignee: Nissan Motor Co., Ltd., Kanagawa, Japan

[21] Appl. No.: 563,655

[22] Filed: Nov. 28, 1995

[30] Foreign Application Priority Data

Nov. 28, 1994 [JP] Japan ................... 6-292670

[51] Int. Cl.$^6$ ............... F16H 15/04; F16H 59/38
[52] U.S. Cl. .................. 477/43; 476/10; 477/46
[58] Field of Search ................ 476/10; 477/43, 477/46, 48

[56] References Cited

U.S. PATENT DOCUMENTS

| | | | |
|---|---|---|---|
| 4,744,032 | 5/1988 | Miyaura et al. | 477/50 X |
| 4,945,483 | 7/1990 | Tokoro | 477/48 X |
| 4,993,284 | 2/1991 | Oshiage | 477/48 X |
| 5,136,495 | 8/1992 | Tokoro et al. | 477/48 X |
| 5,282,400 | 2/1994 | Kobayashi et al. | 477/37 |
| 5,575,732 | 11/1996 | Inoue | 476/10 |

FOREIGN PATENT DOCUMENTS

| | | | |
|---|---|---|---|
| 410448 | 1/1991 | European Pat. Off. | 477/48 |
| 62-167966 | 7/1987 | Japan. | |
| 2-292562 | 4/1990 | Japan. | |

OTHER PUBLICATIONS

SAE Technical Paper Series—901761—Masaki Nakano et al., Dynamic Characteristics of Speed Ratio Control of the Halt Toroidal CVT for Passenger Cars, pp. 25–32.

*Primary Examiner*—Khoi Q. Ta
*Assistant Examiner*—Troy Grabow
*Attorney, Agent, or Firm*—Lowe, Price, Leblanc & Becker

[57] ABSTRACT

A transmission ratio control apparatus for a friction-wheel CVT requires no feedback of the offset of a friction wheel and performs stable transmission ratio control. A control circuit is provided for controlling the offsetting of the friction wheel to change transmission ratio. A first unit of the control circuit determines a target input rotational speed based on the throttle valve opening and the vehicle speed. A second unit determines target transmission ratio corresponding to the target input rotational speed. A third unit determines an rotational angle instructional value for a motor to achieve the target input rotational speed. A fourth unit determines a changing rate of actual transmission ratio based on the input rotational speed and the vehicle speed. A fifth unit corrects the motor rotational angle instructional value to reduce changes in transmission ratio as the transmission ratio changing rate increases, and outputs the corrected instructional value to the motor.

19 Claims, 17 Drawing Sheets

PRIOR ART

PRIOR ART

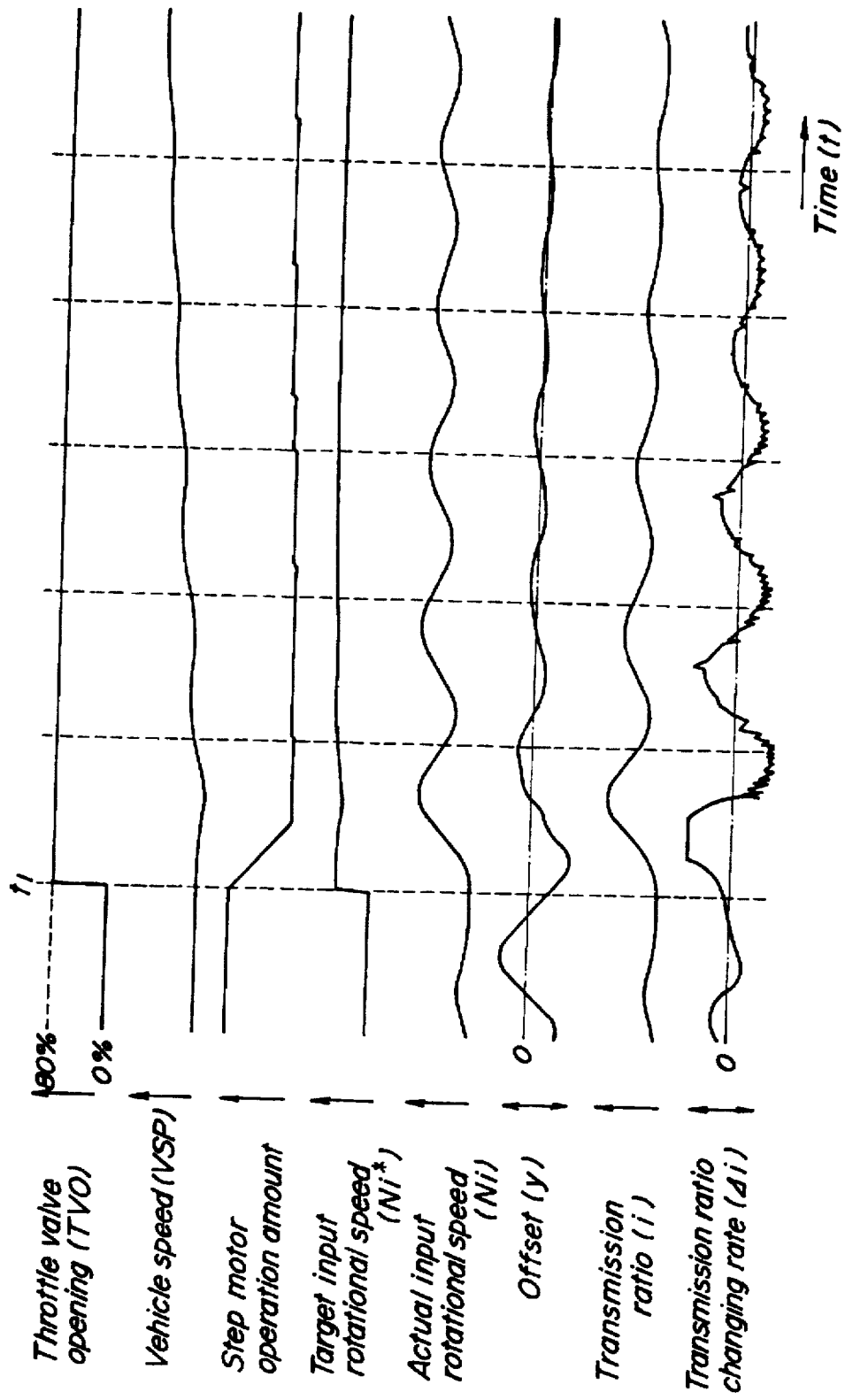

TRANSMISSION CONTROL APPARATUS FOR FRICTION-WHEEL CVT

BACKGROUND OF THE INVENTION

1. Field of the Invention

The present invention relates to a transmission ratio control apparatus for a friction-wheel CVT (continuously variable transmission), such as a toroidal-type CVT.

2. Description of the Related Art

A friction-wheel CVT, such as a toroidal-type CVT, is disclosed in, for example, Japanese Patent Application Laid-open Publication No. 62-167966. A typical friction-wheel CVT has a transmission device, as shown in FIG. 17a, comprising an input disc 1 and an output disc 2 that are aligned coaxially to face each other, and friction wheels 3 disposed between the input and output discs 1 and 2 to transmit drive force by the friction engagement between the friction wheels 3 and the discs 1, 2. The transmission ratio can be continuously changed by tilting the friction wheels 3 or changing an angle φ of the friction-wheel rotational axis $O_2$ to the plane M that is perpendicular to the rotational axis $O_1$ of the input and output discs 1, 2 and that divides the clearance between these discs 1 and 2 into substantially equal parts, that is, the tilt angle φ of the friction wheel 3 about a tilting axis $O_3$ perpendicular to the friction-wheel rotational axis $O_2$. As the tilt angle φ changes, the diameters of frictional engagement arcs between the friction wheel 3 and the input and output discs 1 and 2 accordingly change, thereby continuously changing the transmission ratio.

A normal method for tilting the friction wheels 3 is to offset the friction wheel 3 from a neutral position where the friction-wheel rotational axis $O_2$ intersects the rotational axis $O_1$ of the input and output discs 1, 2, in a direction along the tilting axis $O_3$, by using a hydraulic servo system. This offset from the neutral position automatically causes the friction wheel 3 to tilt about the tilting axis $O_3$. The hydraulic servo system achieves a target transmission ratio based on feedback of the tilt angle φ of the friction wheels 3, that is, an indication of actual transmission ratio. When the target transmission has been achieved, the hydraulic servo system returns the friction wheel 3 to the neutral position, where the offset is 0.

However, the hydraulic servo feedback control based on the tilt angle φ of the friction wheel 3 and disregarding the offset y of the friction wheel 3 may result in significant hunting as indicated in FIG. 18. If the throttle valve opening TVO is abruptly increased from 0% to 80% by kickdown accelerator pedal operation, the control becomes unstable. Corresponding to the kickdown operation, operational amounts as indicated in FIG. 18 are instructed to a step motor for changing the transmission ratio. Control hunting then results as clearly seen from the changes in the offset y, the transmission ratio i, and the actual input rotational speed Ni corresponding to a target input rotational speed Ni* over time, leading to unstable oscillation of the vehicle speed VSP.

Therefore, the offset y of the friction wheel 3 is normally fed back to the hydraulic servo system as described in Japanese Patent Application Laid-open Publication No. 2-292562, and as shown in FIG. 17b. The stroke of a piston 4 for offsetting the friction wheel 3 is controlled by a transmission ratio control valve 5. The transmission ratio control valve 5 comprises a sleeve 5a connected to a step motor 6, and a spool 5 slidably disposed in the sleeve 5a. A stroke instruction value STEP corresponding to a target transmission ratio is inputted to the step motor 6 to accordingly drive the sleeve 5a.

If the valve sleeve 5a is moved in the direction indicated by the arrow in the FIG. 17b, the transmission ratio control valve 5 hydraulically forces the piston 4 downward in the figure to offset the friction wheel 3 (an offset y) in the corresponding direction. The friction wheel 3 is thereby tilted about the tilting axis $O_3$ (a tilt angle φ) to achieve the intended transmission ratio change. The tilt angle φ of the friction wheel 3 is detected by pivot of a precession cam 7 and fed back to the valve spool 5b via a link 8. The valve spool 5b thus follows the displacement of the valve sleeve 5a. When the actual transmission ratio reaches the target transmission ratio corresponding to the stroke instruction value STEP, the valve spool 5b resumes an original position relative to the valve sleeve 5a, that is, an equilibrium position, and the friction wheel 3 returns to the neutral position to and the transmission ratio change.

The offset y of the friction wheel 3 is detected by a stroke of the precession cam 7 from the position indicated by a broken line and the position indicated by a solid line, and fed back to the valve spool 5b via the link 8, thus moving the valve spool 5b by a stroke of, for example, $\Delta L_1$ from the position indicated by a broken line to the position indicated by a solid line. Since the stroke direction of the valve spool 5b is the same as that of the valve sleeve 5a, the feedback of offset y restricts the transmission ratio change. This restriction (or damping effect) substantially solve the above-stated problem of the control hunting.

However, the conventional offset feedback systems suffer from a problem as follows. The friction wheel 3 is clamped between the input and output discs 1, 2 by a thrust in accordance with the currently transmitted torque to enable proper torque transmission trough a train of the input and output discs 1, 2 and the friction wheel 3. The thrust in accordance with the transmitted torque changes the distance between the friction wheel 3 and the piston 4 despite the substantial support rigidity for the friction wheel 3. Since the hydraulic servo system controls the stroke position of the piston 4, a change in the friction wheel-to-piston distance causes a control deviation, thus making it difficult or impossible to change the current transmission ratio to a target transmission ratio.

This problem is inevitable as long as the conventional construction based on a friction wheel tilt angle feedback control system is employed where the offset of the friction wheel 3 is fed back to the spool 5b of the transmission ratio control valve 5 via the precession cam 7 and the link 8.

A measure for solving this problem is described in, for example, the Japanese Patent Application Laid-open Publication No. 2-292562. As indicated in FIG. 17b, the conventional apparatus determines the stroke instruction value STEP to the step motor to achieve the target transmission ratio i* corresponding to the target input rotational speed Ni* that has been determined based on the throttle valve opening TVO and the vehicle speed VSP, considering the torque. More specifically, a transmission input torque Ti is estimated from the current throttle valve opening TVO and the current transmission input rotational speed Ni, and the stroke instruction value STEP to achieve the target transmission ratio i* is varied in accordance with the estimated transmission input torque Ti. In the conventional measure, the instruction STEP is increased as the estimated transmission input torque Ti increases, because an increase in the transmission input torque Ti increases the distance between the friction wheel 3 and the piston 4 and the increased distance will likely further restrict the change of the transmission ratio to a target transmission ratio.

However, such a conventional measure requires individual vehicles to be equipped with a map expressing the relationship between the target transmission ratio i* and the stroke instruction value STEP with a parameter of the transmission input torque Ti, thus increasing production costs. In the present invention, these problems are overcome by an improvement wherein the rotational axis of the friction wheel intersects a rotational axis of the input disc and the output disc, so as to tilt the friction wheel about a tilting axis generally perpendicular to the rotational axis of the friction wheel in order to achieve a change in transmission ratio. A calculating means is provided for calculating an actuator operation amount for the transmission ratio changing actuator corresponding to the target transmission ratio. A determining means determines a changing rate of transmission ratio. In response to at least one of a signal from the calculating means and a signal from the determining means, a correcting means corrects the actuator operation amount to the target transmission ratio in such a manner that a change in transmission ratio is reduced as the changing rate of transmission ratio increases, and for outputting an instruction of the corrected actuator operation amount to the transmission ratio changing actuator.

Since the actuator operation amount is corrected to reduce changes in transmission ratio, the apparatus of the invention substantially prevents hunting in transmission ratio control, thus performing stable transmission ratio control. Furthermore, since the reduction of changes in transmission ratio is enhanced in accordance with increase of the changing rate of transmission ratio, which expresses the offset of the friction wheel as described above, the apparatus of the invention performs stable transmission ratio control appropriately and constantly in substantially the entire wide range of transmission ratio changing conditions.

Since the apparatus of the invention corrects the operation amount for the friction wheel corresponding to a target transmission ratio, in accordance with the changing ratio of transmission ratio, the apparatus substantially eliminates the necessity to mechanically feed back the offset of the friction wheel to the transmission ratio changing actuator via a feedback control system designed mainly for feedback of the tilt angle of the friction wheel. Thus, the apparatus of the invention eliminates the aforementioned problems caused by the conventional control construction where such mechanical feedback of the offset of the friction wheel is required. More specifically, the invention solves the problems in production costs imposed by the maps of operation amounts of the transmission ratio changing actuator relative to target transmission ratios prepared corresponding to various input torque's to the transmission, and the problems of the conventional art in that it is essentially impossible to correct the actuator operation amount so as to precisely correspond to the current target transmission ratio.

It is preferred for the transmission ratio changing actuator to comprise a first member that is moved in response to an instruction from the correcting means; and a second member that receives feedback of tilt angle of the friction wheel but no feedback of offset of the friction wheel, the relative displacement of the first member and the second member being used as a basis for offsetting the friction wheel and returning the friction wheel to the neutral position. Since no feedback of the offset of the friction wheel is used, this construction enhances the advantages of the invention.

It is also preferred for the determining means to detect an input rotational speed to the continuously variable transmission and use a detected input rotational speed in place of a changing rate of transmission ratio. This construction is based on the understanding that because the output rotational speed (the vehicle speed) remains substantially unchanged during the changing of transmission ratio, the change in transmission ratio expressed by the input-output rotational speed ratio can be monitored by the changing rate of the input rotational speed. Since the changing rate of transmission ratio can be readily detected, this construction facilitates cost reduction.

It is further preferred for the correcting means to reduce a correction value used to correct an actuator operation amount for the transmission ratio changing actuator as the rotational speed of the continuously variable transmission increases. This manner of correcting the actuator operation amount further fits characteristics of friction-wheel CVTs wherein the offset needed to achieve a tilt of the friction wheel decreases as the rotational speed increases.

It is also preferred for the correcting means to correct an actuator operation amount for the transmission ratio changing actuator so as to enhance a change in transmission ratio in accordance with increase of a deviation of an actual transmission ratio from the target transmission ratio. This construction speeds up achievement of a target transmission ratio when the difference between the target and actual transmission ratios is large so that control hunting is unlikely, improving the transmission ratio changing responsiveness.

Furthermore, the correcting means preferably assigns zero to the correction value for correcting an actuator operation amount for the transmission ratio changing actuator during a predetermined length of time if a change in the target transmission ratio is greater than a predetermined value. This construction avoids reducing a change in transmission ratio by correction of the actuator operation amount when the target transmission ratio change is large so that control hunting will not occur, improving the responsiveness of transmission ratio change.

Further, the correcting means preferably corrects an actuator operation amount for the transmission ratio changing actuator so as to reduce the enhancement of changing rate of transmission ratio in accordance with length of elapsed time during a predetermined length of time if a change in the target transmission ratio is greater than a predetermined value. While the enhanced change in the transmission ratio improves the transmission ratio changing responsiveness, the construction also reduces the change of the actuator operation amount that occurs when the predetermined length of time has elapsed, thus preventing a sudden large change in transmission ratio.

BRIEF DESCRIPTION OF THE DRAWINGS

The foregoing and further objects, features and advantages of the present invention will become apparent from the following description of preferred embodiments with reference to the accompanying drawings, wherein:

FIG. 18 is a time chart illustrating the operation of the conventional transmission ratio control apparatus.

DETAILED DESCRIPTION OF PREFERRED EMBODIMENTS

Preferred embodiments of the present invention will be described hereinafter with reference to the accompanying drawings.

Figure 1:
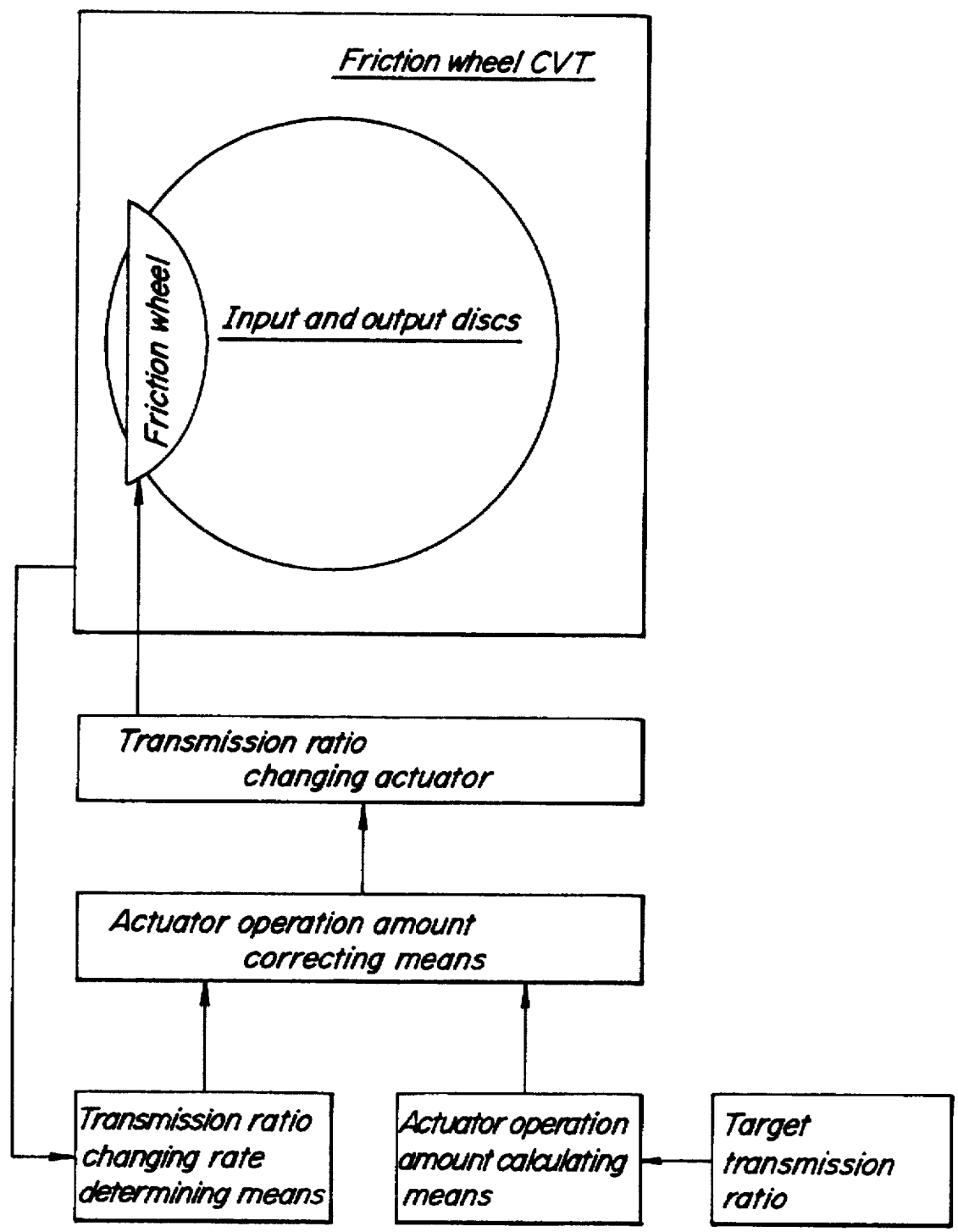
FIG. 1 is a conceptual diagram of the transmission ratio control apparatus for a friction-wheel CVT of the invention.
Figure 2:
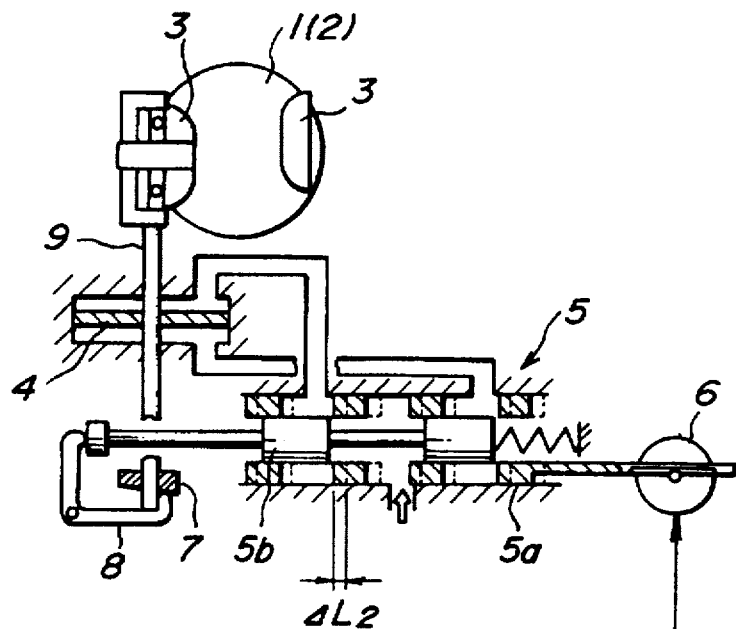
FIG. 2 illustrates a transmission ratio control system according to the present invention that controls the transmission ratio of a toroidal-type CVT as one example of friction-wheel CVT.
Figure 2:
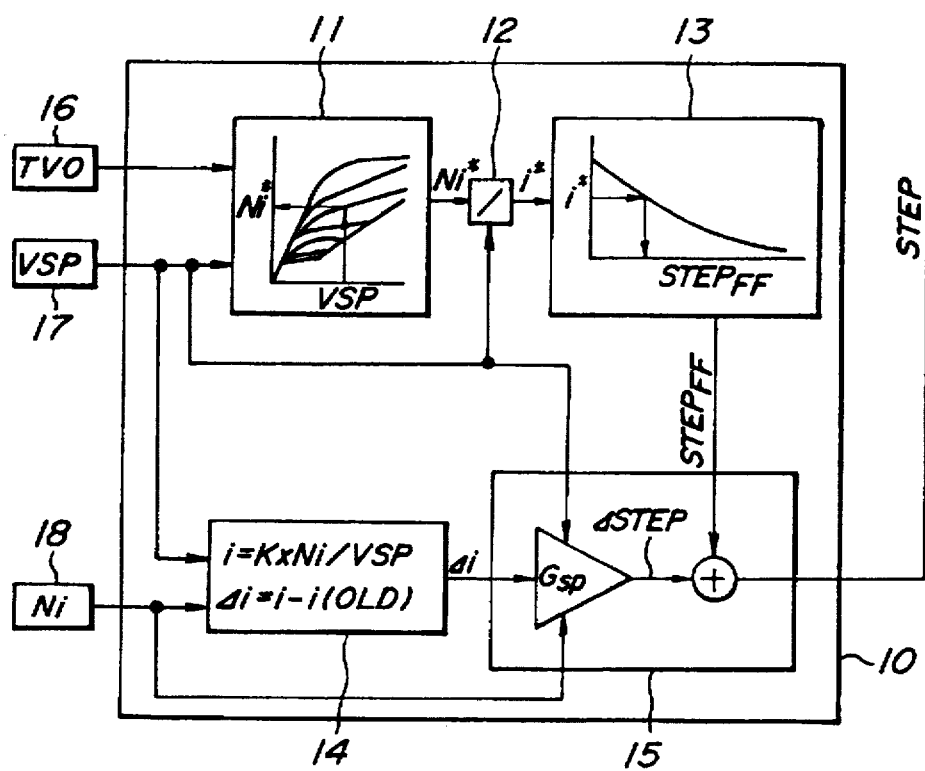
Figure 3A:
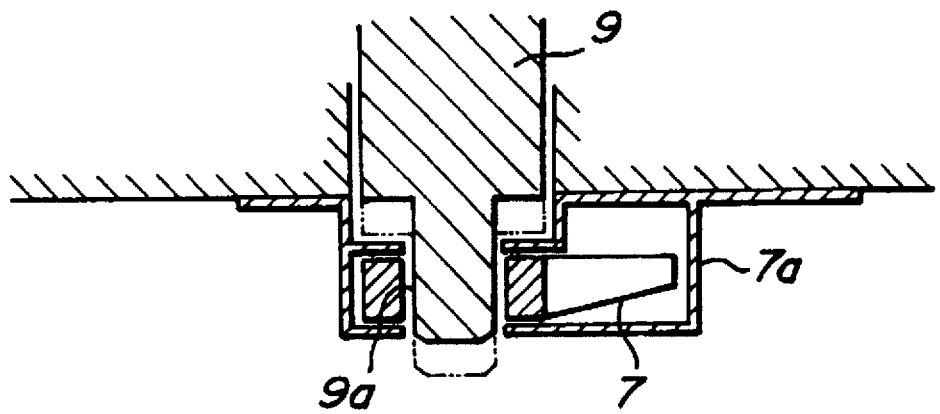
FIG. 3a is a detailed sectional view of a precession cam mounting structure in which a precession cam is connected to a trunnion of the toroidal-type CVT.
Figure 3B:
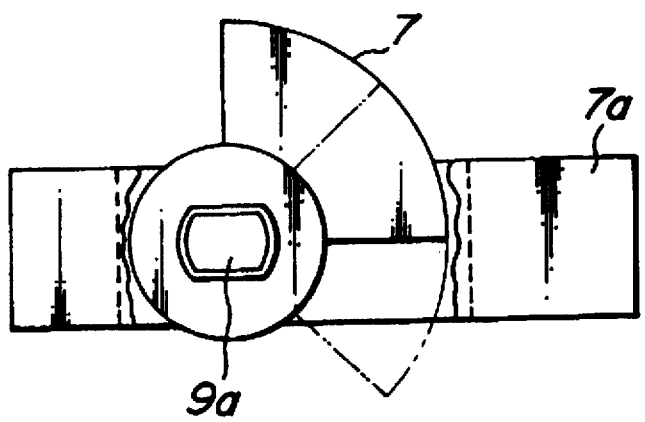
FIG. 3b is a bottom plan view of the precession cam mounting structure.

A first embodiment of the invention will be described in conjunction with a toroidal-type CVT (continuously variable transmission) as shown in FIGS. 2, 3a and 3b. The toroidal-type CVT has a transmission train essentially composed of an input conical disc 1, an output conical disc (not shown) disposed facing the input conical disc 1 (above the sheet of the drawing) and coaxially with the input conical disc 1, and a plurality of friction wheels in the form of power rollers 3 disposed between the input and output conical discs for transmitting drive force therebetween by friction engagement.

Figure 17A:
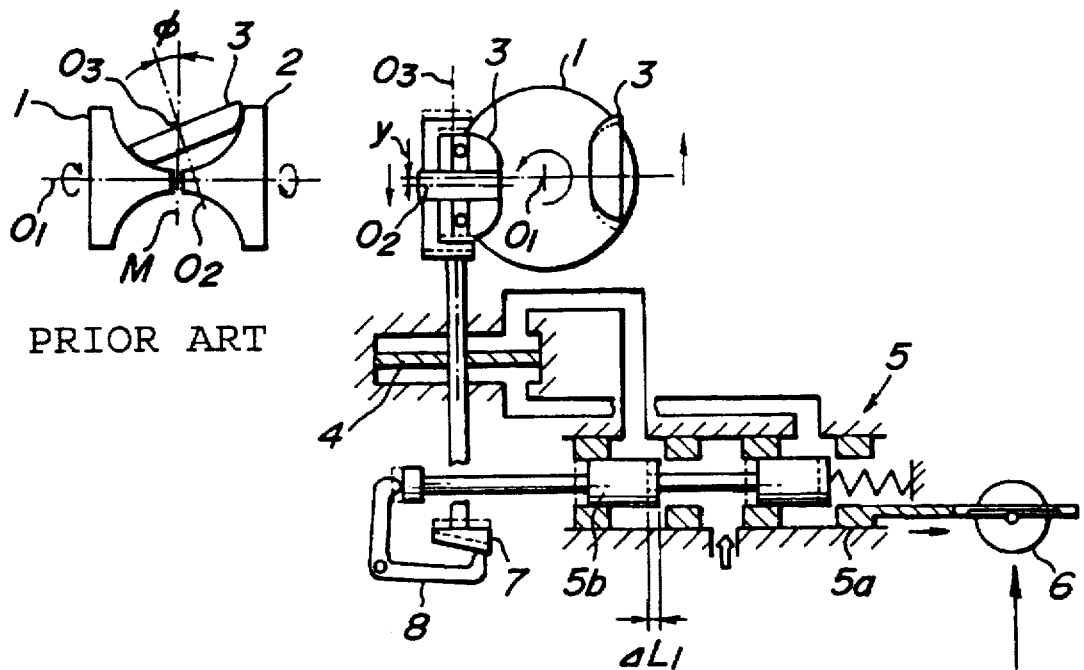
FIGS. 17a and 17b schematically illustrate a conventional transmission ratio control apparatus for a friction-wheel CVT.
Figure 17B:
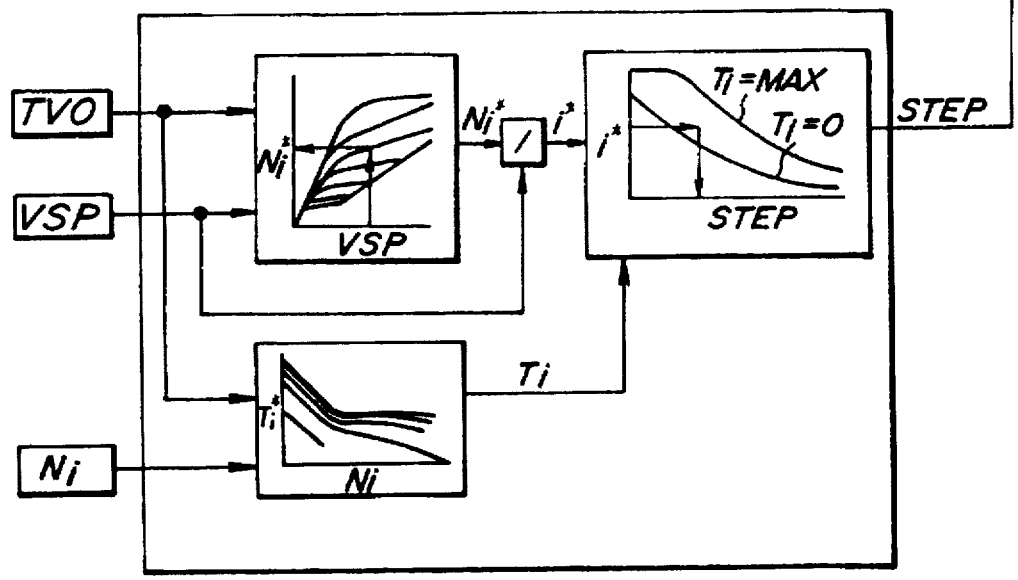

To change transmission ratio, the power rollers 3 are offset as in the friction wheels 3 shown in FIG. 17 (as indicated by offset y in FIG. 17). Then, power rollers 3 tilt (as indicated by a tilt angle φ in FIG. 17) to continuously change the diameters of the arcs of friction engagement between the power rollers 3 and the input and output conical discs. A predetermined change of transmission ratio is thus carried out.

A transmission ratio changing actuator for offsetting the power rollers 3 is constructed as follows. The description will be made with reference to one of the power rollers 3. A trunnion 9 rotatably supporting the power roller 3 is rigidly connected to a piston 4. A transmission ratio control valve 5 for controlling the stroke of the piston 4 is essentially composed of a valve sleeve 5a whose stroke position is determined by a step motor 6, and a valve spool 5b slidably fitted in the valve sleeve 5a. When the step motor 6 slides the valve sleeve 5a, the piston is displaced in accordance with the positional change of the valve sleeve 5a relative to the valve spool 5b by the operation of the control valve 5. The control valve 5 thus causes the power roller 3 to offset and accordingly tilt so as to change the transmission ratio to a target ratio.

The valve spool 5b is associated, via a link 6, with a precession cam 7 connected to a trunnion 9. The precession cam 7 is fitted on a noncircular end 9a of the trunnion 9 slidably with respect to the direction of the axis of the trunnion 9. The axial position of the precession cam 7 is fixed by a cam case 7a. Thus, the precession cam 7 is rotated by the tilting of the power roller 3 but not thrust or moved by the offsetting of the power roller 3. Because of the operation of the precession cam 7, a tilt of the power roller 3 alone (no offset thereof) is fed back to the valve spool 5b via the link 8.

According to this feedback control, the valve spool 5b is moved to follow the displacement of the valve sleeve 5a caused by the step motor 6 during the changing of transmission ratio. When the actual transmission ratio substantially equals the target transmission ratio, the valve spool 5b resumes the original position relative to the valve sleeve 5a, and the power roller 3 is returned to the neutral position. The changing of transmission ratio is thus completed.

However, if the valve spool 5b of the transmission ratio control valve 5 receives feedback of the tilt angle but no feedback of the offset y thereof, control hunting will occur as described in conjunction with FIG. 18. To prevent hunting, this embodiment employs a transmission ratio control circuit 10 for determining an operation amount STEP to be performed by the step motor 6 as shown in FIG. 2.

The transmission ratio control circuit 10 comprises a target input rotational speed determining unit 11, a target transmission ratio determining unit 12, a unit 13 for determining an actuator operation amount, a unit 14 for determining the changing rate of transmission ratio, and a unit 15 for correcting the actuator operation amount. The transmission ratio control circuit 10 receives a signal from a throttle valve opening sensor 16 for detecting the throttle valve opening TVO, a signal from a vehicle speed sensor 17 for detecting the vehicle speed VSP, and an input rotational speed sensor 18 for detecting the input rotational speed Ni to the CVT.

Figure 8:
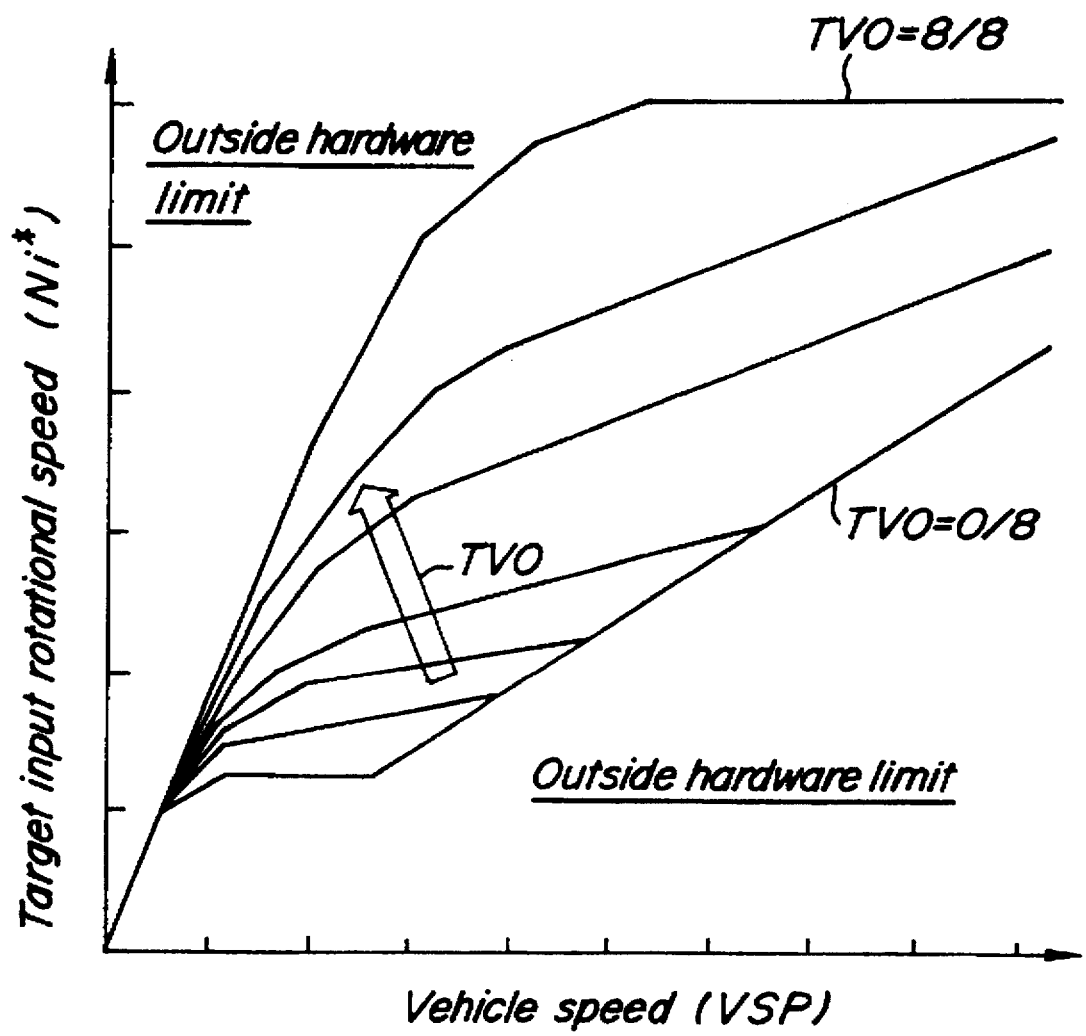
FIG. 8 is a graph indicating a transmission pattern of a toroidal-type CVT.
Figure 9:
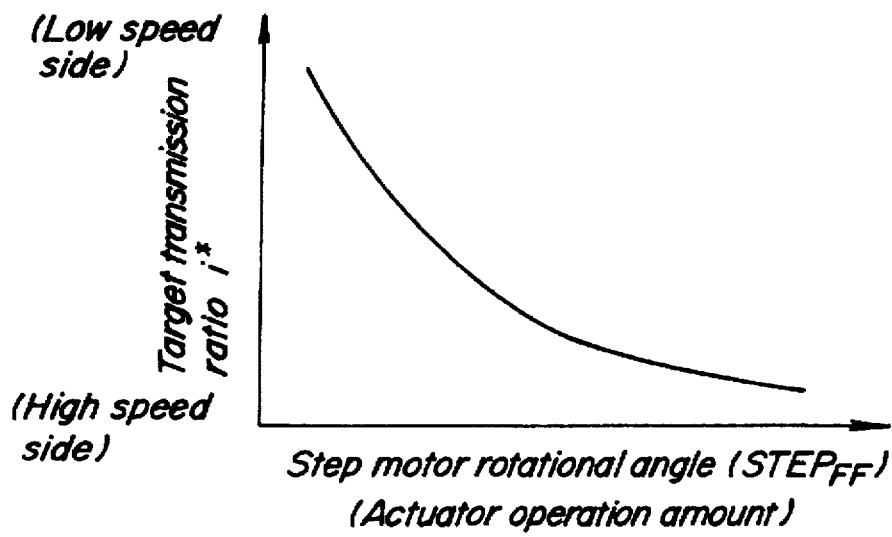
FIG. 9 shows a hardware characteristic curve based on the target transmission ratio and the step motor rotational speed to achieve the target transmission ratio.

The target input rotational speed determining unit 11, the target transmission ratio determining unit 12 and the operation amount determining unit 13 constitute the calculating means for calculating an operational amount of an actuator. The target input rotational speed determining unit 11 retrieves a target input rotational speed Ni* corresponding to a combination of a current throttle valve opening TVO and a current vehicle speed VSP, based on a transmission pattern as illustrated in FIG. 8. The pattern has been predetermined through experiments so that suitable target input rotational speeds can be obtained corresponding to various operational conditions. The target transmission ratio determining unit 12 then divides the target input rotational speed Ni* by the current vehicle speed VSP to obtain a target transmission ratio i*. The actuator operation amount determining unit 13 determines an rotational angle instruction value STEP$_{FF}$ for the step motor 6 (that is, an acutator operation amount) based on the hardware characteristic curve as shown in FIG. 9, to achieve the target transmission ratio i*.

The transmission ratio changing rate determining unit 14 corresponds to the determining means for determining changing rate of transmission ratio. The unit 14 calculates an actual transmission ratio i based on a current input rotational speed Ni and the current vehicle speed VSP using the equation: i=k×Ni/VSP, where k is a constant for converting vehicle speed VSP to transmission output rotational speed. Then, the unit 14 obtains a difference Δi between the current actual transmission ratio i and the actual transmission ratio i(OLD) obtained a predetermined length of time before, that is, Δi=i−i(old). The transmission ratio change Δi during the predetermined length of time is used to determine a transmission ratio changing rate.

Figure 10:
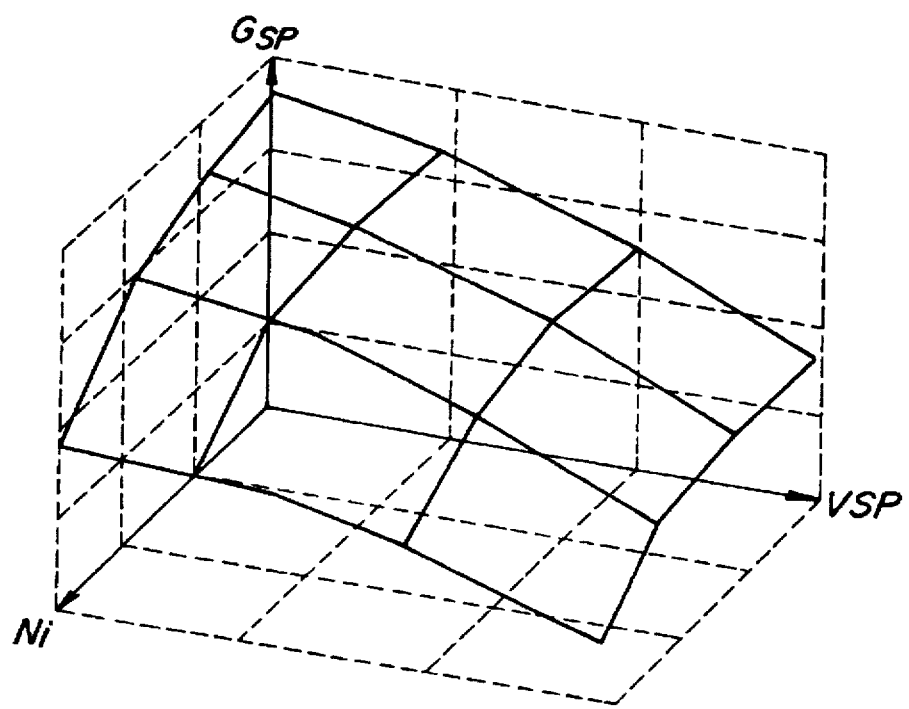
FIG. 10 illustrates a three-dimensional map illustrating a changing characteristic in relation to the correction gain for the step motor rotational angle.

The correcting unit 15 corresponds to the correcting means for correcting actuator operation amount. The unit 15 obtains a step-motor rotational angle instructional value STEP that is corrected as described below, based on the transmission ratio changing rate Δi, the vehicle speed VSP, the input rotational speed Ni and the step-motor rotational angle instructional value (actuator operation amount) STEP$_{FF}$. First, a correction gain G$_{Sp}$ corresponding to the current vehicle speed VSP and the current input rotational speed Ni is retrieved from a three-dimensional map as indicated in FIG. 10. The map as in FIG. 10 is obtained by, for example, developing the inverse function of a function of the transmission ratio changing rate corresponding to the offset of the power roller 3 with parameters of the vehicle speed VSP and the input rotational speed Ni. Then, a correction value ΔSTEP for the step-motor rotational angle instructional value (actuator operation amount) is obtained by multiplying the correction gain G$_{Sp}$ and the transmission ratio changing rate Δi, that is, ΔSTEP=G$_{Sp}$×Δi. The correction value ΔSTEP is added to the step-motor rotational angle instruction value (actuator operation amount) STEP$_{FF}$ to obtain a corrected rotational angle instruction value (actuator operation amount) STEP for the step motor 6, that is STEP=STEP$_{FF}$+ΔSTEP.

Figure 11:
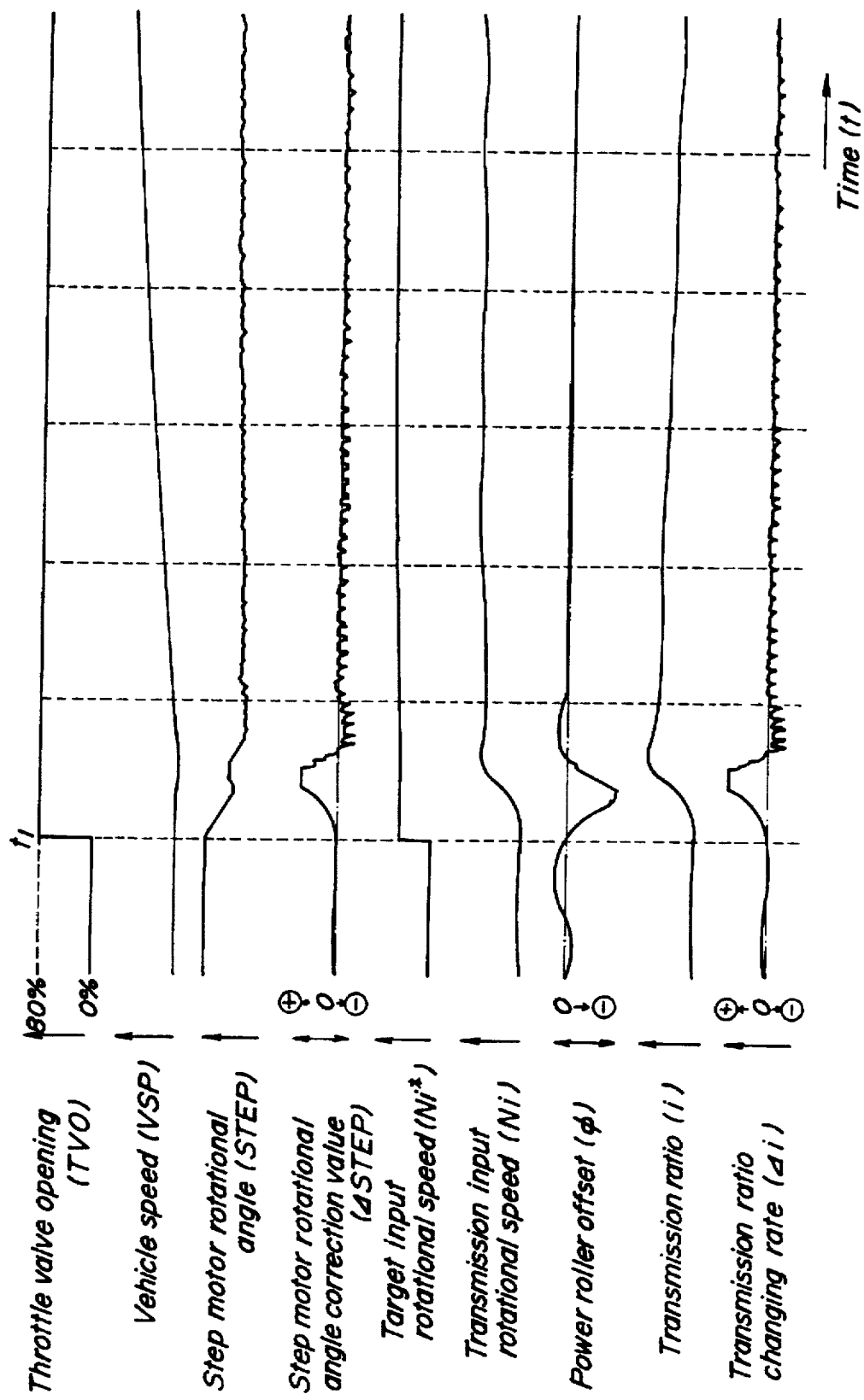
FIG. 11 is a time chart illustrating the operation of the transmission ratio control apparatus as shown in FIG. 2, based on simulation.

The step-motor rotational angle instructional value (actuator operation amount) STEP$_{FF}$ obtained by the transmission ratio control circuit 10 allows for the transmission ratio control to substantially equalize the actual transmission ratio to the target transmission ratio i*. The correction value ΔSTEP allows for stabilization of transmission ratio control because of the following reasons. The correction gain G$_{Sp}$ used to determine the correction value ΔSTEP is always positive as indicated in FIG. 10 while the transmission ratio changing rate Δi, which is also used to determine the correction value ΔSTEP, becomes positive to a downshift transmission ratio change and becomes negative for an upshift transmission ratio change as understood from the corresponding equation performed by the transmission ratio changing rate determining unit 14. Therefore, the correction value ΔSTEP becomes positive for a downshift transmission ratio change and becomes negative for an upshift transmission ratio change as understood from the equation to determine ΔSTEP. That is, the step-motor rotational angle instructional value is corrected to provide a shift in the target transmission ratio i* toward the high speed side for a downshift transmission ratio change and a shift toward the low speed side for an upshift transmission ratio change, as understood with reference to the hardware characteristic curve shown in FIG. 9. As a result, the correction of the step-motor rotational angel instructional value using the correction value ΔSTEP is performed to provide a shift (as indicated by ΔL$_2$ in FIG. 2) in displacement of the valve sleeve 5a in a direction such that a change in transmission ratio is reduced. The transmission ratio control is thus stabilized by preventing control hunting as indicated in FIG. 11, which illustrates the results of a simulation performed under the same conditions as in the simulation with a conventional art (FIG. 18).

Since unlike the conventional apparatus as shown in FIG. 17, the embodiment does not feed back the distance between the power roller 3 and the piston 4 that changes depending the transmitted torque, to the spool 5b of the transmission ratio control valve 5, the map used by the actuator operation amount determining unit 13 to determine step-motor rotational angle instructional value STEP$_{FF}$ does not require input torque as a parameter, as understood from the map shown in FIG. 9. Thus, problems of the conventional art related to costs and control precision can be eliminated.

According to this embodiment, the correction gain G$_{Sp}$ is reduced to reduce the correction value ΔSTEP as the vehicle speed VSP (transmission output rotational speed) increases, and as the transmission input rotational speed Ni increases, that is, as the rotational speed of the CVT increases. Since the offset required to achieve a certain amount of tilt of the power roller decreases as the transmission rotational speed increases, excessive extent of correction would result in a high rotational speed range if the correction value ΔSTEP were not reduced for a high rotational speed range compared with a low rotational speed range. Because this embodiment reduces the correction gain G$_{Sp}$ as the transmission rational speed increases (as indicated in FIG. 10), the embodiment can provide the correction value ΔSTEP for the step-motor rotational angle instruction value that fits the characteristics of the toroidal-type CVT, that is, the correction value ΔSTEP that is appropriate over substantially the entire rotational speed range.

Although this embodiment employs the precession cam 7 connected to the trunnion 9 so as to be rotatable together with the trunnion 9 but axially slidably in relation to the trunnion 9 in order to feed back the tilt of the power roller 3 to the valve spool 5b but not the offset of the power roller 3, elimination of feedback of the offset of the power roller 3 to the valve spool 5b is not essential to the present invention. For example, the link ratio of the link 8 may be suitably determined to reduce feedback sensitivity with respect to the offset of the power roller 3, achieving substantially the same advantages as achieved by this embodiment.

Figure 4:
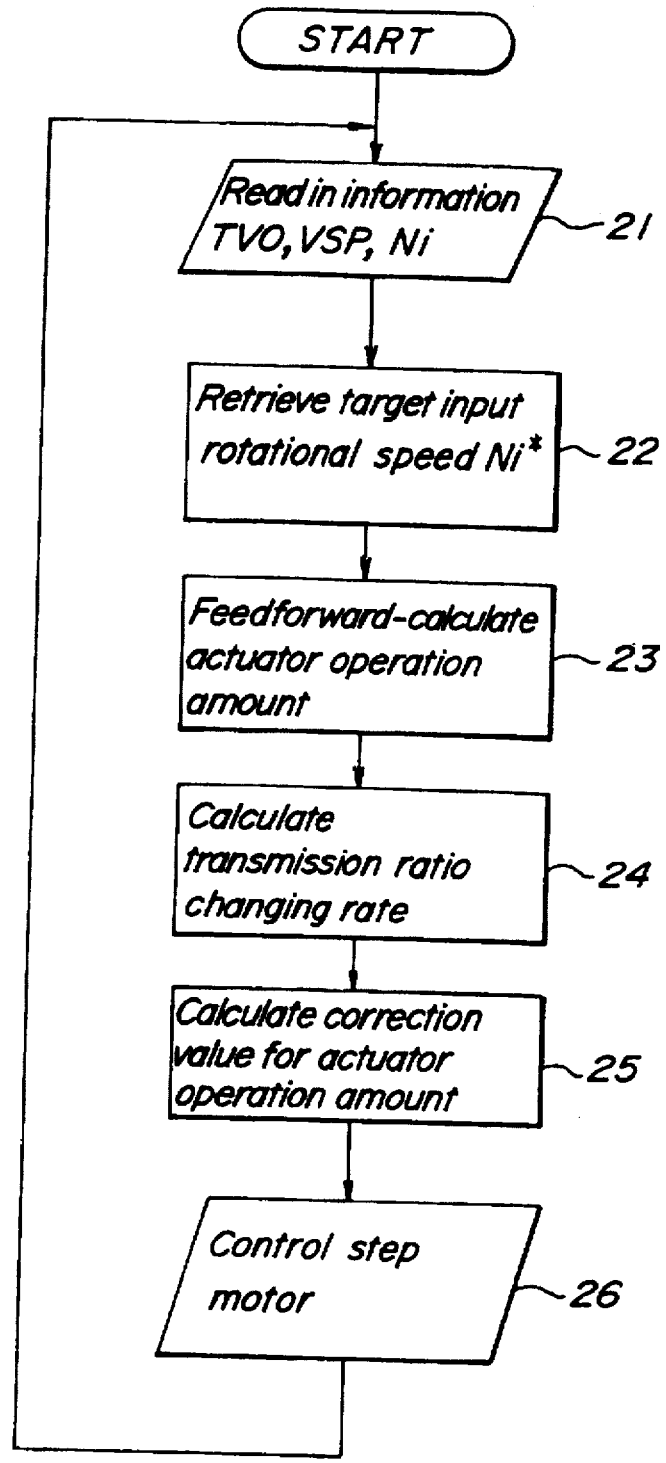
FIG. 4 is a flowchart of a main routine of the transmission ratio control program to be executed by a controller comprising a microcomputer.
Figure 5:
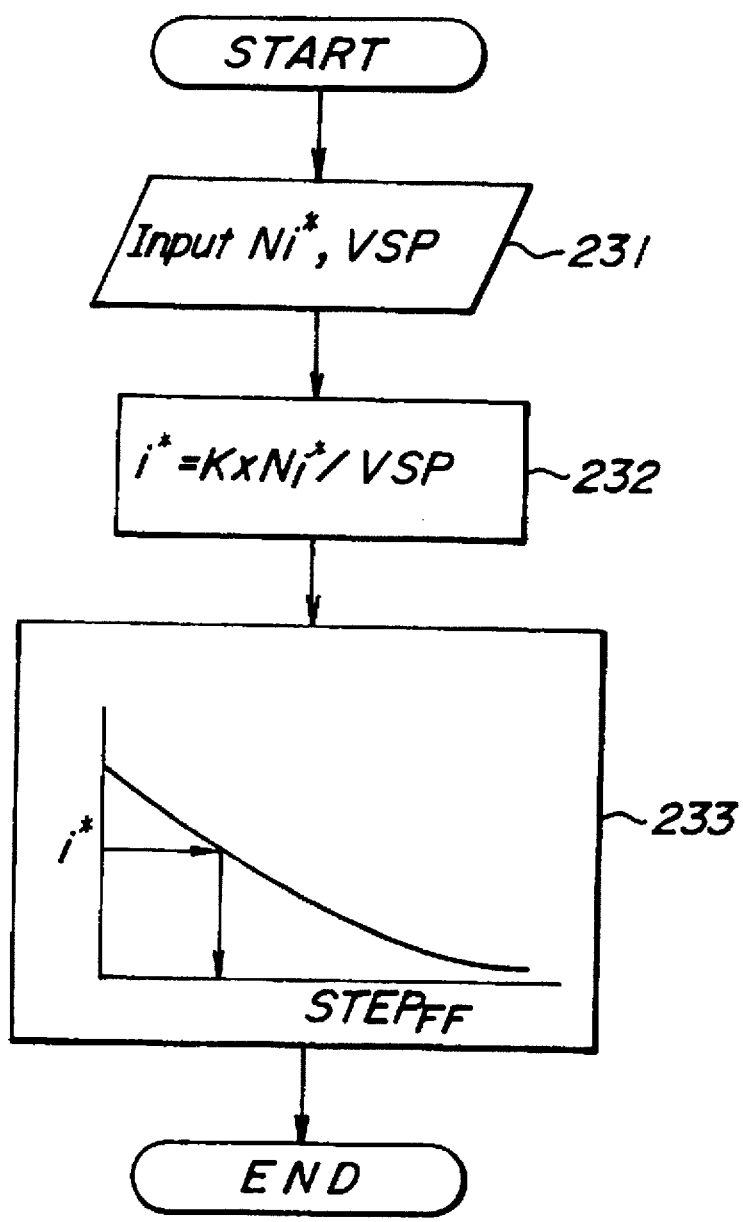
FIG. 5 is a flowchart of a subroutine of feedforward calculation of the amount of actuator operation.

The transmission ratio control circuit 10 may be constructed by using a micro-processor. A control program of the micro-processor as illustrated in FIG. 4 will achieve substantially the same advantages as achieved by the construction described above. In step 21, the transmission ratio control circuit 10 inputs the current throttle valve opening TVO, the current vehicle speed VSP and the current transmission input rotational speed Ni. The circuit 10 retrieves in step 22 target input rotational speed Ni* corresponding to the combination of the throttle valve opening TVO and the vehicle speed VSP based on the transmission ratio pattern as indicated in FIG. 8. Step 23 executes a program as illustrated in FIG. 5 to perform feedforward calculation of a step-motor operation amount. In the program as in FIG. 5, step 231 inputs the target input rotational speed Ni* and the vehicle speed VSP. Step 232 calculates a target transmission ration i* using an equation: i*=k×Ni*/VSP, where k is a constant to convert vehicle speed VSP to transmission output rotational speed. Step 233 determines a step-motor rotational angle instruction value (actuator operation amount) $STEP_{FF}$ to achieve the target transmission ratio i*, based on the hardware characteristic curve shown in FIG. 9. It should be understood that steps 22 and 23 correspond to the actuator operation amount calculating means.

Figure 6A:
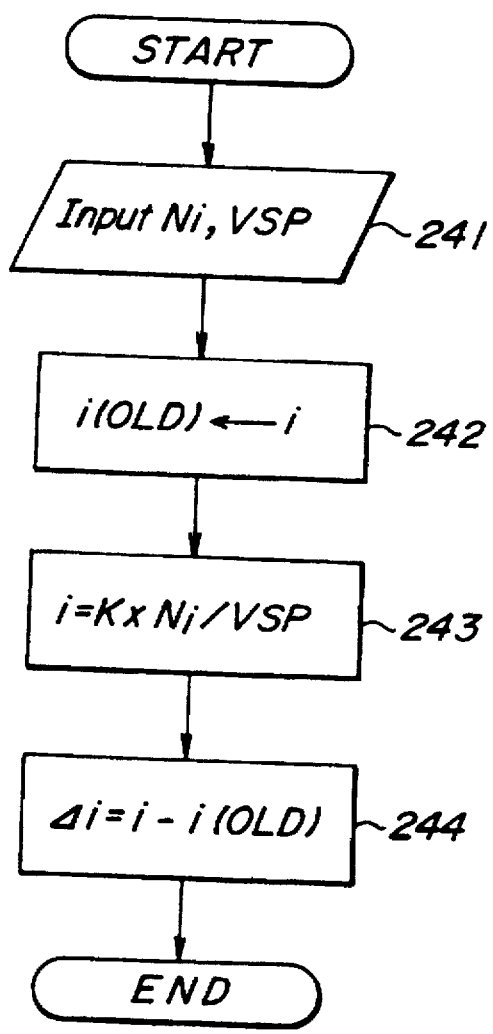
FIG. 6a is a flowchart of a subroutine of the processing for calculating a transmission-ratio changing rate.

In the program illustrated in FIG. 4, step 24 corresponds to the calculating means for calculating a changing rate of transmission ratio. The processing of step 24 is illustrated in detail in FIG. 6a. Step 241 inputs the input rotational speed Ni* and the vehicle speed VSP. Step 242 sets the actual transmission ratio i determined in step 243 in a previous processing cycle to i(OLD). Step 243 calculates a current actual transmission ratio i based on the input rotational speed Ni and the vehicle speed VSP by using an equation: i=k×Ni/VSP, where k is a constant to convert vehicle speed VSP to transmission output rotational speed. Step 244 obtains the difference Δi between the current actual transmission ratio i and the previous actual transmission ratio i(OLD) determined in the previous processing cycle (constant cycle), that is, a predetermined length of time before, by using an equation: Δi=i−i(old). The transmission ratio change Δi during the predetermined length of time is used to determine a transmission ratio changing rate. As described above, the transmission ratio changing rate Δi becomes positive for a downshift transmission ratio change and negative for a upshift transmission ratio change.

Figure 6B:
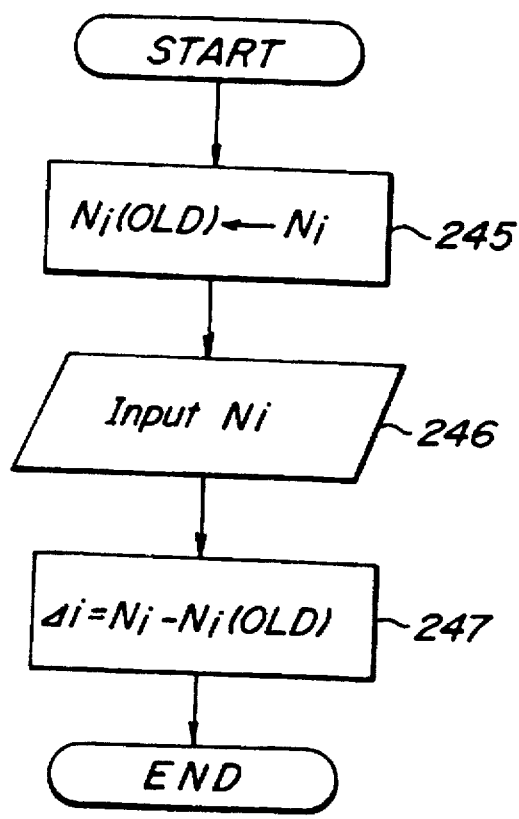
FIG. 6 (b) is a flowchart of another subroutine of the processing for calculating a transmission-ratio changing rate, according to a modification of the embodiment.

Since during a transmission ratio change, the vehicle speed VSP remains substantially unchanged, that is, it can be considered constant, the transmission ratio changing ratio can also be determined based on a change in transmission ratio during one processing cycle as illustrated in FIG. 6b. Step 245 sets the previous transmission input rotational speed inputted in the previous processing cycle to Ni(OLD). Step 246 inputs the current transmission input rotational speed Ni. Step 247 obtains the different between the current and previous transmission input rotational speeds Ni and Ni(OLD), by using an equation: Δi=Ni−Ni(OLD). The value Δi is then used to determined a transmission ratio changing rate. This processing for determining the transmission ratio changing rate requires less costs.

Figure 7:
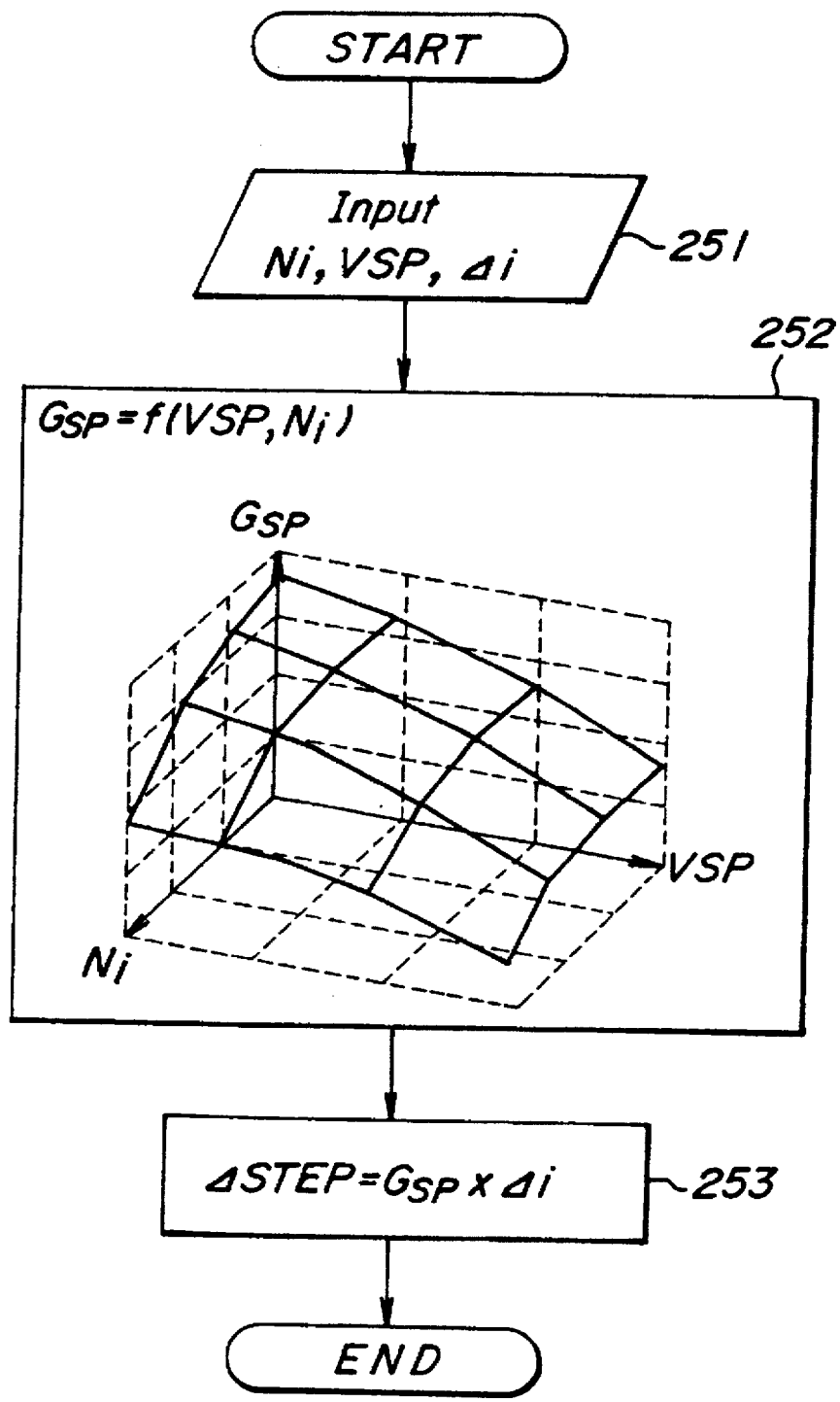
FIG. 7 is a flowchart of a subroutine of the processing for calculating a correction value for the amount of actuator operation.

Step 25 in the program illustrated in FIG. 4 executes a control program as illustrated in FIG. 7 to calculate a correction value for correcting the actuator operation amount (step-motor instructional operation angle). Step 251 inputs the input rotational speed Ni, the vehicle speed VSP and the transmission ratio changing rate Δi. Step 252 retrieves a positive correction gain $G_{Sp}$ corresponding to the vehicle speed VSP and the input rotational speed, based on the three-dimensional map as illustrated in FIG. 10. Step 253 multiplies the correction gain $G_{Sp}$ by the transmission ratio changing rate Δi to obtain a correction value ΔSTEP for the step-motor rotational angle instruction value (actuator operation amount), that is, ΔSTEP=$G_{Sp}$×Δi.

Step 256 in the program illustrated in FIG. 4 adds the correction value ΔSTEP for the feedforward instruction value $STEP_{FF}$ for the step-motor rotational angel (actuator operation amount) obtained in step 23 to obtain a corrected step-motor rotational angel instructional value (actuator operation amount) STEP=$STEP_{FF}$+ΔSTEP, and outputs it to the step motor 6. The processing of the step-motor 6 is controlled in accordance with the corrected motor rotational angle instructional value STEP. It should be understood that steps 25, 26 correspond to the correcting means for correcting actuator operation amount.

This construction performs substantially the same transmission ratio control as performed by the above-described construction not having a micro-processor. That is, the step-motor rotational angle instructional value (actuator operation amount) $STEP_{FF}$ provides for transmission ratio control such that the actual transmission ratio becomes substantially equal to the target transmission ratio i*. The correction value ΔSTEP provides for correction of the step-motor rotational angle instructional value so as to reduce the change of transmission ratio. Thus, control hunting is substantially prevented to achieve stable transmission ratio control.

Since unlike the conventional apparatus as shown in FIG. 17, the embodiment does not perform feedback of the distance between the power roller 3 and the piston 4 that changes depending the transmitted torque, to the spool 5b of the transmission ratio control valve 5, the map used in step 23 to determine a step-motor rotational angle instruction value $STEP_{FF}$ does not need to include input torque as a parameter, as understood from the map shown in FIG. 9. Thus, problems of the conventional art related to costs and control precision can be eliminated.

Figure 12:
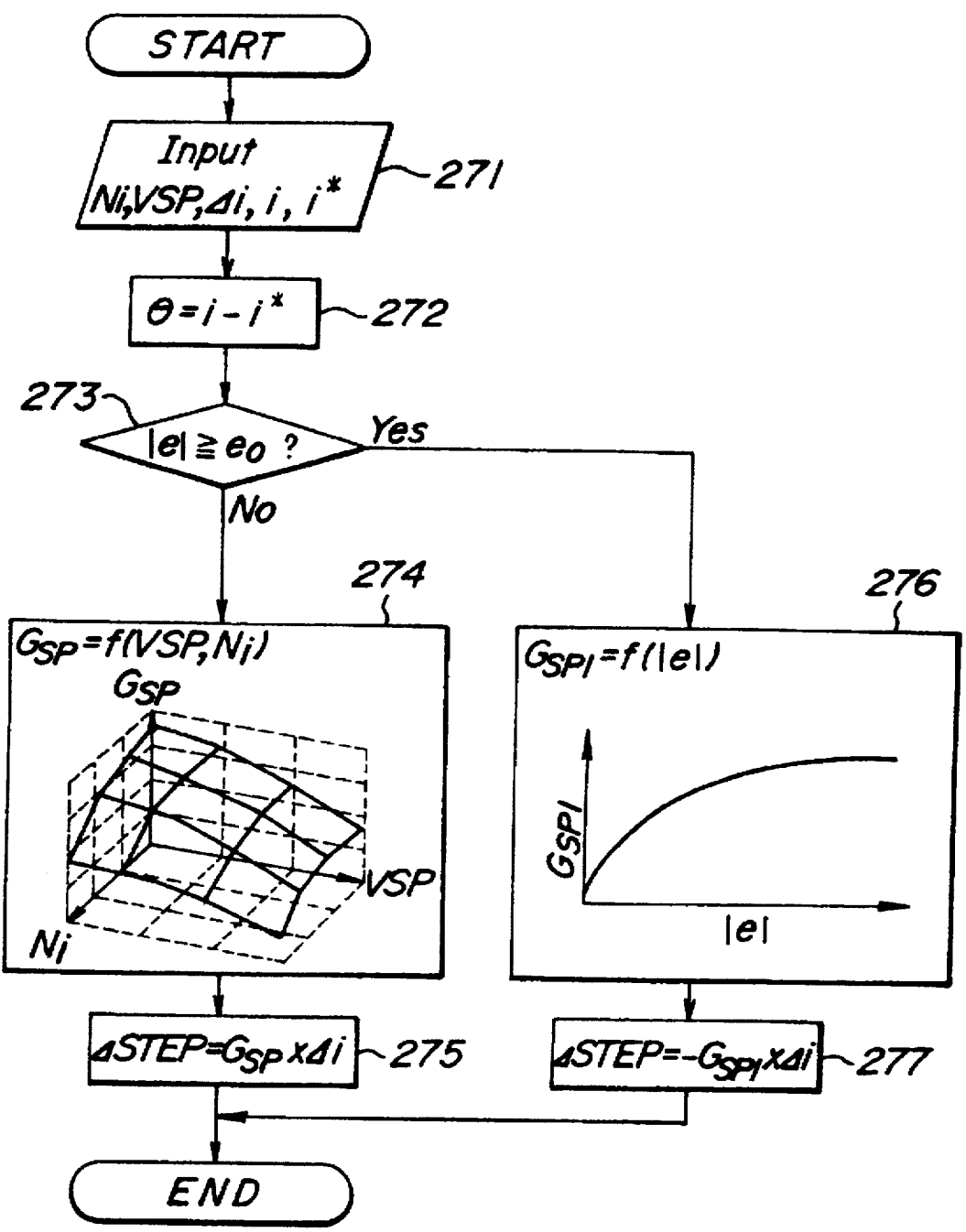
FIG. 12 is a flowchart of a subroutine of the processing for calculating a correction value for the amount of actuator operation, according to another embodiment.

FIG. 12 illustrates an operation of determining a correction value ΔSTEP for the actuator operation amount (step-motor rotational angle) according to another embodiment. This operation corresponds to the operation of step 25 in FIG. 4 (illustrated in detail in FIG. 7). According to this embodiment, the transmission ratio control circuit 10 inputs the transmission input rotational speed Ni, the vehicle speed VSP, the transmission ratio changing rate Δi, the actual transmission ratio i, and the target transmission ratio i* in step 271. Step 272 determines a deviation • of the actual transmission ratio i from the target transmission ratio i*, that is •=i−i*. Step 273 determines whether the absolute value of the transmission ratio deviation e, that is |•|, equals or exceeds a predetermined value $e_o$. If the transmission deviation absolute value |•| is less than the predetermined value $e_o$, the operation proceeds to steps 274 and 275, where a correction value ΔSTEP for the actuator operation amount (step-motor rotational angle) is determined based on the correction gain $G_{Sp}$ indicated in FIG. 10, as in steps 252 and 253 in FIG. 7. The transmission ratio control is thereby stabilized.

On the other hand, if the transmission deviation absolute value |•| equals or exceeds the predetermined value $e_o$, the operation proceeds to step 276, where a correction gain $G_{Sp}$ corresponding to the transmission ratio deviation absolute value |e| is retrieved based on an increasing function as indicated in step 276 in FIG. 12. Step 277 determines a correction value ΔSTEP for the actuator operation amount (step-motor rotational angle) by using an equation: ΔSTEP= −$G_{Sp}$×Δi. The correction gain $G_{Sp}$ is always positive and increases as the transmission ratio deviation absolute value |•| increases. The transmission ratio changing rate Δi becomes positive for a downshift transmission ratio change and negative for an upshift transmission ratio change, as stated above. Therefore, the correction value ΔSTEP becomes negative for a downshift transmission ratio change and positive for an upshift transmission ratio change. The step-motor rotational angle instructional value is corrected to provide a shift in the target transmission ratio toward the low speed side for a downshift transmission ratio change and a shift toward the high speed side for an upshift transmission ratio change, as understood with reference to the hardware characteristic curve shown in FIG. 9. In short, the step-motor rotational angle instructional value is corrected by the correction value ΔSTEP so as to enhance changes in transmission ratio.

According to this embodiment, when the transmission ratio deviation absolute value |·| equals or exceeds the predetermined value ·₀ so that hunting will not occur, that is, when the above-described measure for stabilizing the transmission ratio control is not required, the step-motor rotational angle instructional value is corrected so as to speed up equalization of the actual transmission ratio to the target transmission ratio. The embodiment thus improves the responsiveness in the changing of transmission ratio. Furthermore, since the correction gain $G_{Sp}$ increases as the transmission ratio deviation absolute value |·| increases, the transmission ratio changing responsiveness is further enhanced as the transmission ratio deviation absolute value |·| becomes greater. The embodiment thus achieves excellent transmission ratio changing responsiveness.

Figure 13:
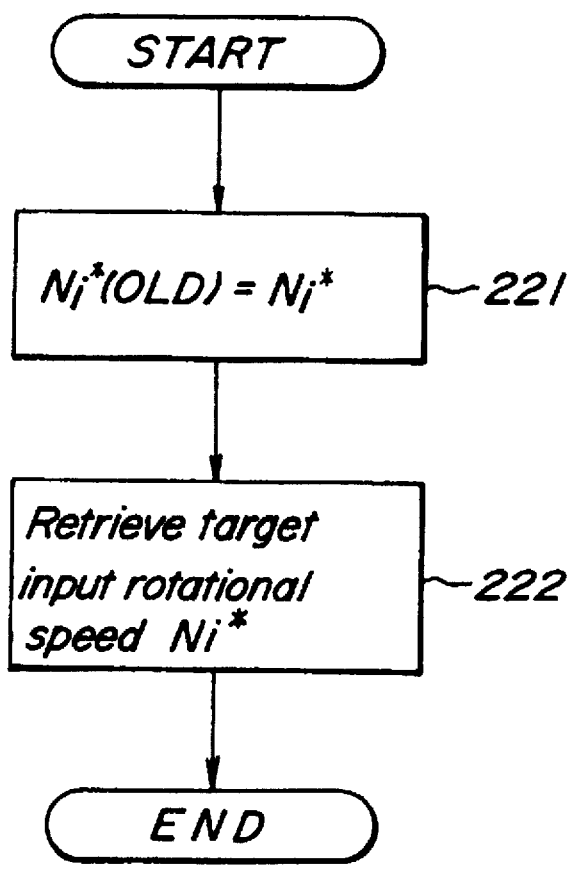
FIG. 13 is a flowchart of a subroutine of the processing for calculating a target input rotational speed, according to a further embodiment.
Figure 14:
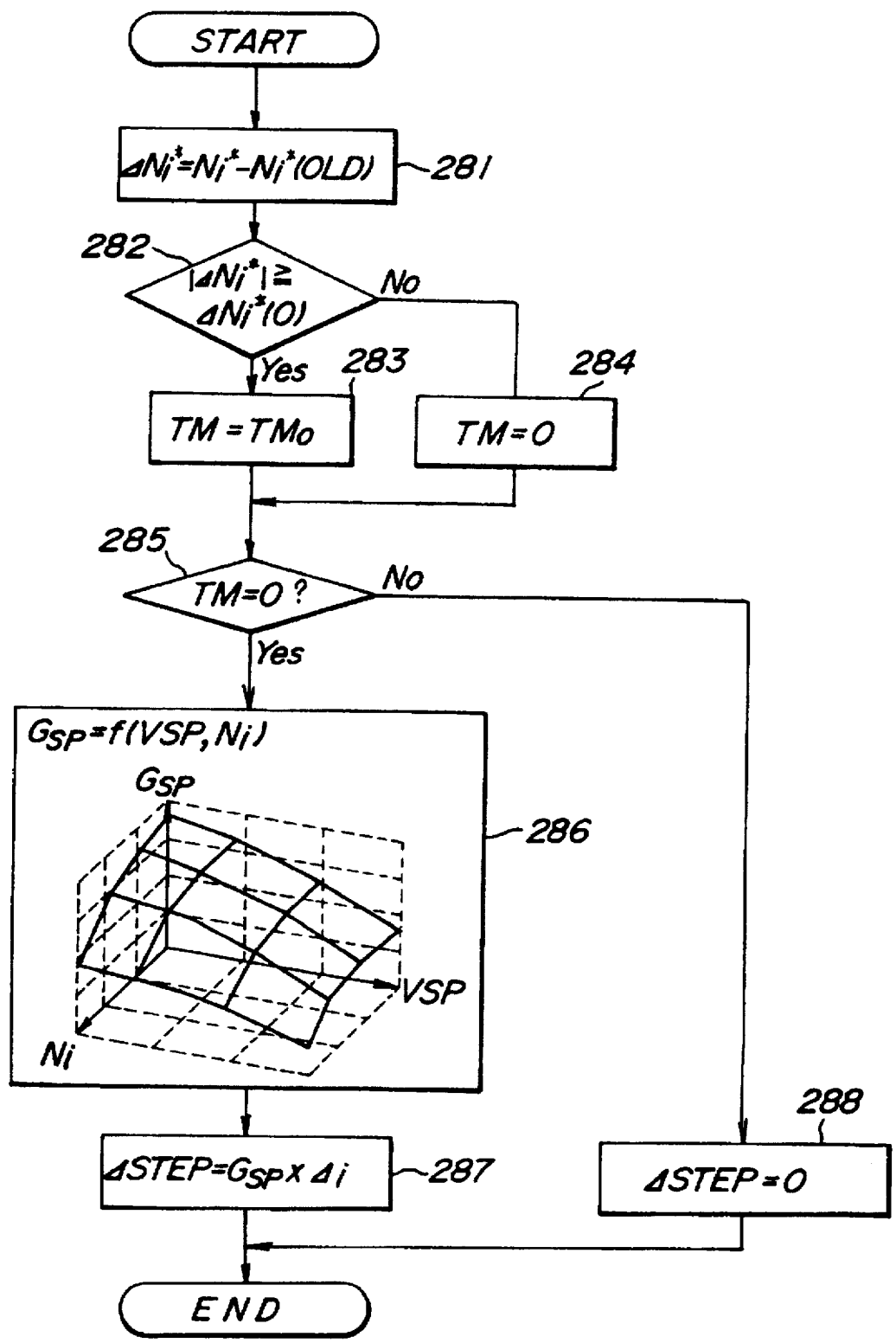
FIG. 14 is a flowchart of a subroutine of the processing for calculating a correction value for an amount of actuator operation, according to the embodiment as illustrated in FIG. 13.
Figure 15:
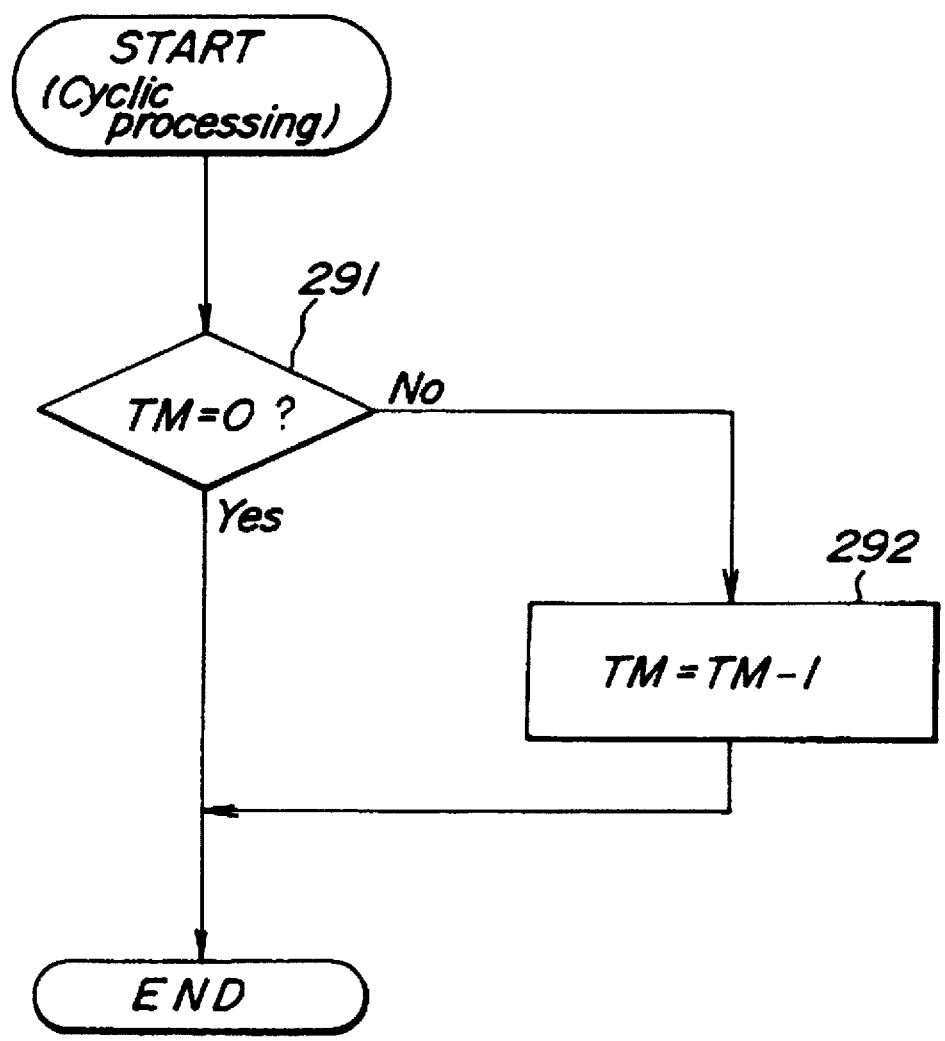
FIG. 15 is a flowchart of a subroutine of the periodical timer decrement processing, according to the embodiment as illustrated in FIG. 13.

FIGS. 13 to 15 illustrate still another embodiment of the transmission ratio control apparatus of the invention. This embodiment stops correcting the step-motor rotational angle instructional value for a predetermined length of time if a difference between the target input rotational speeds Ni is greater than a predetermined value. The embodiment thus improves the transmission ratio changing responsiveness.

FIG. 13 illustrates in detail the processing of step 22 in a program as illustrated in FIG. 4. Step 221 sets the previous target transmission ratio Ni* to Ni*(OLD). Step 222 retrieves a current transmission ratio Ni* corresponding to the vehicle speed and the throttle valve opening TVO based on the map as illustrated in FIG. 8.

FIG. 14 illustrates in detail the processing of step 25 in FIG. 4. Step 281 calculates the difference ΔNi* between the current input rotational speed Ni* and the previous input rotational speed Ni*(OLD), that is ΔNi*=Ni*−Ni*(OLD). Step 282 determines whether the input rotational speed difference ΔNi* equals or exceeds a predetermined value ΔNi*(0). If it equals or exceeds the predetermined value ΔNi*(0), a timer TM is set to a predetermined length of time TM₀ in step 283. If the difference ΔNi* is less than the predetermined value ΔNi*(0), the timer is reset to 0 in step 283.

The timer is operated by the cyclic processing illustrated in FIG. 15. The timer TM is decremented in step 292 until step 291 detects TM=0.

Step 282 in FIG. 14 determines whether the timer TM reaches 0, that is, whether the set time TM₀ has elapsed since it was determined in step 282 that ΔNi*≧ΔNi*(0). If the set time TM₀ has elapsed, the operation proceeds to steps 286 and 287, where a correction value ΔSTEP for the actuator operation amount (step-motor rotational angle) is determined based on the correction gain $G_{Sp}$ indicated in FIG. 10, as in steps 252 and 253 in FIG. 7. The transmission ratio control is thereby stabilized.

On the other hand, if the set time TM₀ has not elapsed yet, step 288 assigns 0 to the correction value ΔSTEP for the actuator operation amount (step-motor rotational angle). This means that during a period after it is determined in step 282 that the target transmission ratio different ΔNi* equals or exceeds the predetermined value ΔNi*(0) until the set time TM₀ elapses, that is, while the transmission ratio difference is great so that control hunting will not occur, the actuator operation amount is not corrected to reduce a transmission ratio change. The embodiment thus improves the transmission ratio changing responsiveness. The correction value ΔSTEP is determined to correct the actuator operation amount (step-motor rotational angle) in steps 286, 287 after the set time TM₀ has elapsed, thereby stabilizing the transmission ratio control.

Figure 16:
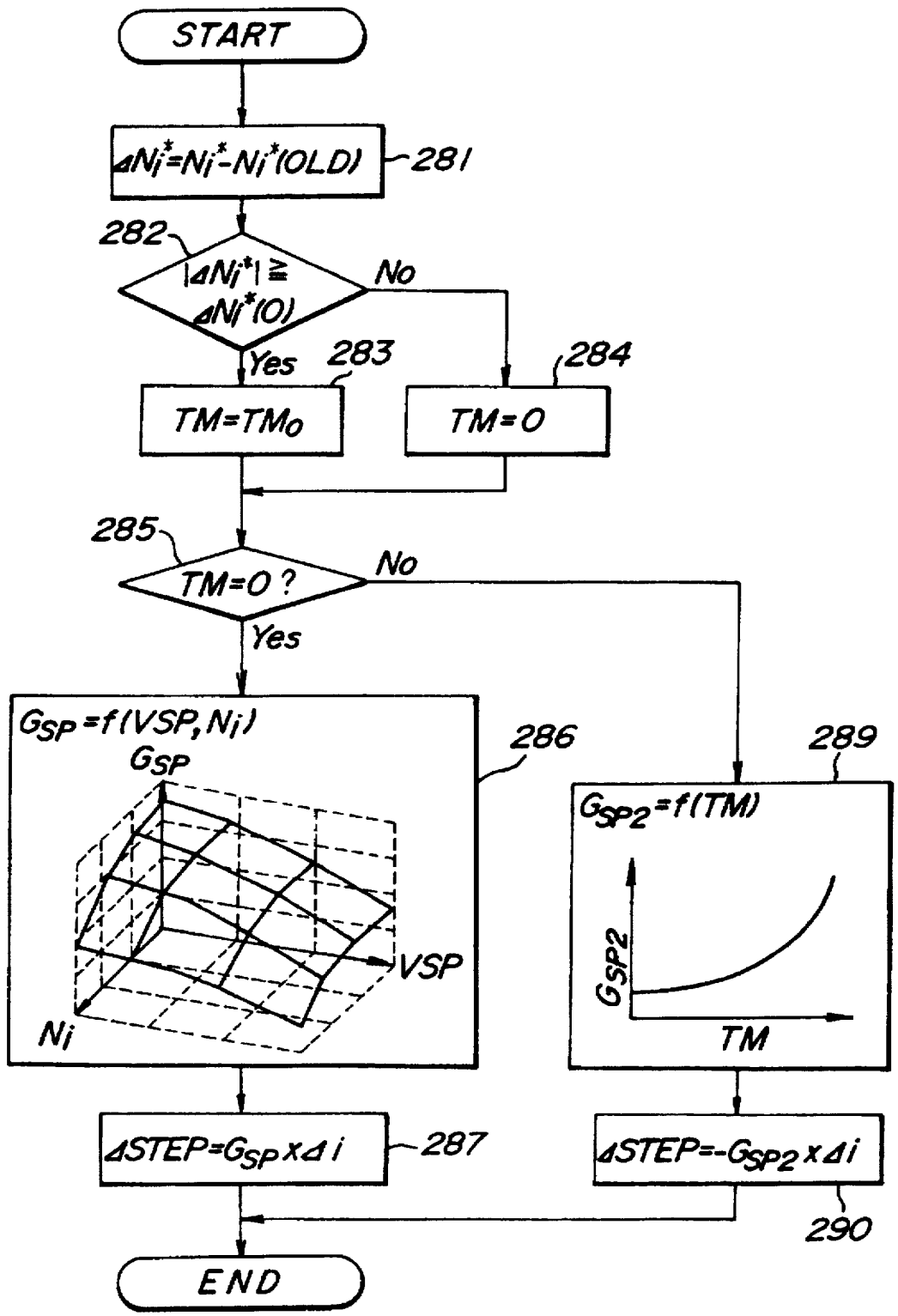
FIG. 16 is a flowchart of a subroutine of the processing for calculating a correction value for an amount of actuator operation, according to a modification.

Although this embodiment improves the transmission ratio changing responsiveness by assigning 0 to the correction value ΔSTEP for the actuator operation amount (step-motor rotational angle) in step 288, the transmission ratio changing responsiveness may be improved by other manners, for example, by the processing as illustrated by steps 289 and 290 in FIG. 16. Steps 289 and 290 determines a correction value ΔSTEP to enhance a transmission ratio change, and reduce the extent of enhancement as time elapses, as described below. In FIGS. 16, steps comparable to those in FIG. 14 are denoted by comparable numerals, and will not be described again. If step 285 determines that the set time TM₀ has not elapsed since it was determined in step 282 that ΔNi*≧ΔNi*(0), the operation proceeds to step 289, where a correction gain $G_{Sp2}$ corresponding to the timer value TM is retrieved based on a decreasing function (that is, the correction gain $G_{Sp2}$ decreases as the timer value TM decreases over time) as indicated in step 289 in FIG. 16. Step 290 determines a correction value ΔSTEP for the actuator operation amount (step-motor rotational angle) by using an equation: $\Delta STEP = -G_{Sp2} \times \Delta i$.

Since the correction gain $G_{Sp2}$ is positive, the step-motor rotational angle instruction value is corrected to provide a shift in the target transmission ratio toward the low speed side for a downshift transmission ratio change and a shift toward the high speed side for an upshift transmission ratio change. That is, the step-motor rotational angle instructional value is corrected by the correction value ΔSTEP so as to enhance changes in transmission ratio, thus improving the transmission ratio changing responsiveness. In addition, since the correction gain $G_{Sp2}$ decreases as the timer value TM decreases over time, the correction value ΔSTEP is determines so as to reduce the extent of enhancement of transmission ratio changes as the timer value TM decreases over time. This manner of operation reduces a change of the step motor operation angle occurring at the moment the TM₀ elapses, that is, when the operation for improving the transmission ratio changing responsiveness terminates, thus preventing a sudden sharp change in transmission ratio.

While the present invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A transmission ratio control apparatus for a friction-wheel continuously variable transmission comprising:

a friction wheel disposed between an input disc and an output disc for transmitting drive force therebetween;

a transmission ratio changing actuator that is operated in accordance with a target transmission ratio determined in accordance with operational conditions, to offset the friction wheel from a neutral position where a rotational axis of the friction wheel intersects a rotational axis of the input disc and the output disc, so as to tilt the friction wheel about a tilting axis generally perpendicular to the rotational axis of the friction wheel in order to achieve a change in transmission ratio;

calculating means for calculating an actuator operation amount for the transmission ratio changing actuator corresponding to the target transmission ratio;

determining means for determining a changing rate of transmission ratio; and correcting means responsive to signals from the calculating means and the determining means, respectively, for correcting the actuator operation amount corresponding to the target transmission ratio so that a change in transmission ratio is reduced as the changing rate of transmission ratio increases, and for outputting an instruction of the corrected actuator operation amount to the transmission ratio changing actuator.

2. A transmission ratio control apparatus for a friction-wheel continuously variable transmission according to claim 1, wherein the transmission ratio changing actuator comprises:

a first member that is moved in response to an instruction from the correcting means; and a second member that receives feedback of the tilt angle of the friction wheel but no feedback of offset of the friction wheel, the relative displacement of the first member and the second member being used as a basis for offsetting the friction wheel and returning the friction wheel to the neutral position.

3. A transmission ratio control apparatus for a friction-wheel continuously variable transmission according to claim 1, wherein the determining means detects a changing rate of an input rotational speed of the continuously variable transmission and uses the detected changing rate of the input rotational speed as a representative of a changing rate of the transmission ratio.

4. A transmission ratio control apparatus for a friction-wheel continuously variable transmission according to claim 1, wherein the correcting means reduces a correction value used to correct an actuator operation amount for the transmission ratio changing actuator as the rotational speed of the continuously variable transmission increases.

5. A transmission ratio control apparatus for a friction-wheel continuously variable transmission according to claim 1, wherein the correcting means corrects an actuator operation amount for the transmission ratio changing actuator so as to enhance a change in transmission ratio in accordance with increase of a deviation of an actual transmission ratio from the target transmission ratio.

6. A transmission ratio control apparatus for a friction-wheel continuously variable transmission according to claim 1, wherein the correcting means assigns zero to the correction value for correcting an actuator operation amount for the transmission ratio changing actuator during a predetermined length of time if a change in the target transmission ratio is greater than a predetermined value.

7. A transmission ratio control apparatus for a friction-wheel continuously variable transmission according to claim 1, wherein the correcting means corrects an actuator operation amount for the transmission ratio changing actuator so as to reduce the enhancement of changing rate of transmission ratio in accordance with length of elapsed time during a predetermined length of time if a change in the target transmission ratio is greater than a predetermined value.

8. A transmission ratio control apparatus for a friction-wheel continuously variable transmission according to claim 2, wherein the determining means detects a changing rate of an input rotational speed of the continuously variable transmission and uses the detected changing rate of the input rotational speed as a representative of a changing rate of transmission ratio.

9. A transmission ratio control apparatus for a friction-wheel continuously variable transmission according to claim 2, wherein the correcting means reduces a correction value used to correct an actuator operation amount for the transmission ratio changing actuator as the rotational speed of the continuously variable transmission increases.

10. A transmission ratio control apparatus for a friction-wheel continuously variable transmission according to claim 2, wherein the correcting means corrects an actuator operation amount for the transmission ratio changing actuator so as to enhance a change in transmission ratio in accordance with increase of a deviation of an actual transmission ratio from the target transmission ratio.

11. A transmission ratio control apparatus for a friction-wheel continuously variable transmission according to claim 2, wherein the correcting means assigns zero to the correction value for correcting an actuator operation amount for the transmission ratio changing actuator during a predetermined length of time if a change in the target transmission ratio is greater than a predetermined value.

12. A transmission ratio control apparatus for a friction-wheel continuously variable transmission according to claim 2, wherein the correcting means corrects an actuator operation amount for the transmission ratio changing actuator so as to reduce the enhancement of changing rate of transmission ratio in accordance with length of elapsed time during a predetermined length of time if a change in the target transmission ratio is greater than a predetermined value.

13. A transmission ratio control apparatus for a friction-wheel continuously variable transmission according to claim 3, wherein the correcting means reduces a correction value used to correct an actuator operation amount for the transmission ratio changing actuator as the rotational speed of the continuously variable transmission increases.

14. A transmission ratio control apparatus for a friction-wheel continuously variable transmission according to claim 3, wherein the correcting means corrects an actuator operation amount for the transmission ratio changing actuator so as to enhance a change in transmission ratio in accordance with increase of a deviation of an actual transmission ratio from the target transmission ratio.

15. A transmission ratio control apparatus for a friction-wheel continuously variable transmission according to claim 3, wherein the correcting means assigns zero to the correction value for correcting an actuator operation amount for the transmission ratio changing actuator during a predetermined length of time if a change in the target transmission ratio is greater than a predetermined value.

16. A transmission ratio control apparatus for a friction-wheel continuously variable transmission according to claim 3, wherein the correcting means corrects an actuator operation amount for transmission ratio changing actuator so as to reduce the enhancement of changing rate of transmission ratio in accordance with length of elapsed time during a predetermined length of time if a change in the target transmission ratio is greater than a predetermined value.

17. A transmission ratio control apparatus for a friction-wheel continuously variable transmission according to claim 4, wherein the correcting means corrects an actuator operation amount for the transmission ratio changing actuator so as to enhance a change in transmission ratio in accordance with increase of a deviation of an actual transmission ratio from the target transmission ratio.

18. A transmission ratio control apparatus for a friction-wheel continuously variable transmission according to claim 4, wherein the correcting means assigns zero to the correction value for correcting an actuator operation amount for the transmission ratio changing actuator during a predetermined length of time if a change in the target transmission ratio is greater than a predetermined value.

19. A transmission ratio control apparatus for a friction-wheel continuously variable transmission according to claim 3, wherein the correcting means corrects an actuator operation amount for the transmission ratio changing actuator so as to reduce the enhancement of changing rate of transmission ratio in accordance with length of elapsed time during a predetermined length of time if a change in the target transmission ratio is greater than a predetermined value.

* * * * *